United States Patent

[11] 3,570,420

| [72] | Inventors | Raymond K. Lewis;<br>Marion G. Bingham, Harris County, Tex. |
| --- | --- | --- |
| [21] | Appl. No. | 35,488 |
| [22] | Filed | May 7, 1970 |
| [45] | Patented | Mar. 16, 1971 |
| [73] | Assignee | Milchem Incorporation<br>Houston, Tex. |

[54] PROCESS FOR THE REMOVAL OF HYDROCARBONS CONTAINED IN EARTH CUTTINGS FROM SUBTERRANEAN WELLS
5 Claims, 1 Drawing Fig.

| [52] | U.S. Cl. | 110/8 |
| --- | --- | --- |
| [51] | Int. Cl. | F23g 7/00 |
| [50] | Field of Search | 175/66;<br>166/.5; 110/7, 8, 18 |

[56] References Cited
UNITED STATES PATENTS

| 2,576,283 | 11/1951 | Chaney | 175/66 |
| --- | --- | --- | --- |
| 3,330,230 | 7/1967 | Sasaki | 110/18X |
| 3,408,968 | 11/1968 | Pantoja | 110/18X |
| 3,481,290 | 12/1969 | Wunderley | 110/8 |

Primary Examiner—Kenneth W. Sprague
Attorneys—Bertram H. Mann, Frank B. Pugsley, James G. Ulmer, Delmar L. Sroufe and Larry B. Feldcamp ABSTRACT: The present invention relates to a continuous combustion process for the substantially complete removal of the hydrocarbon content of cuttings from subterranean wells by combustion means which do not emit air-fouling gases. A feature of this invention is the provision of means for retarding the movement of cuttings through an elongated combustion apparatus to subject them to conditions of high temperature and an excess of oxygen to obtain complete combustion of the hydrocarbon content thereof.

Patented March 16, 1971 3,570,420
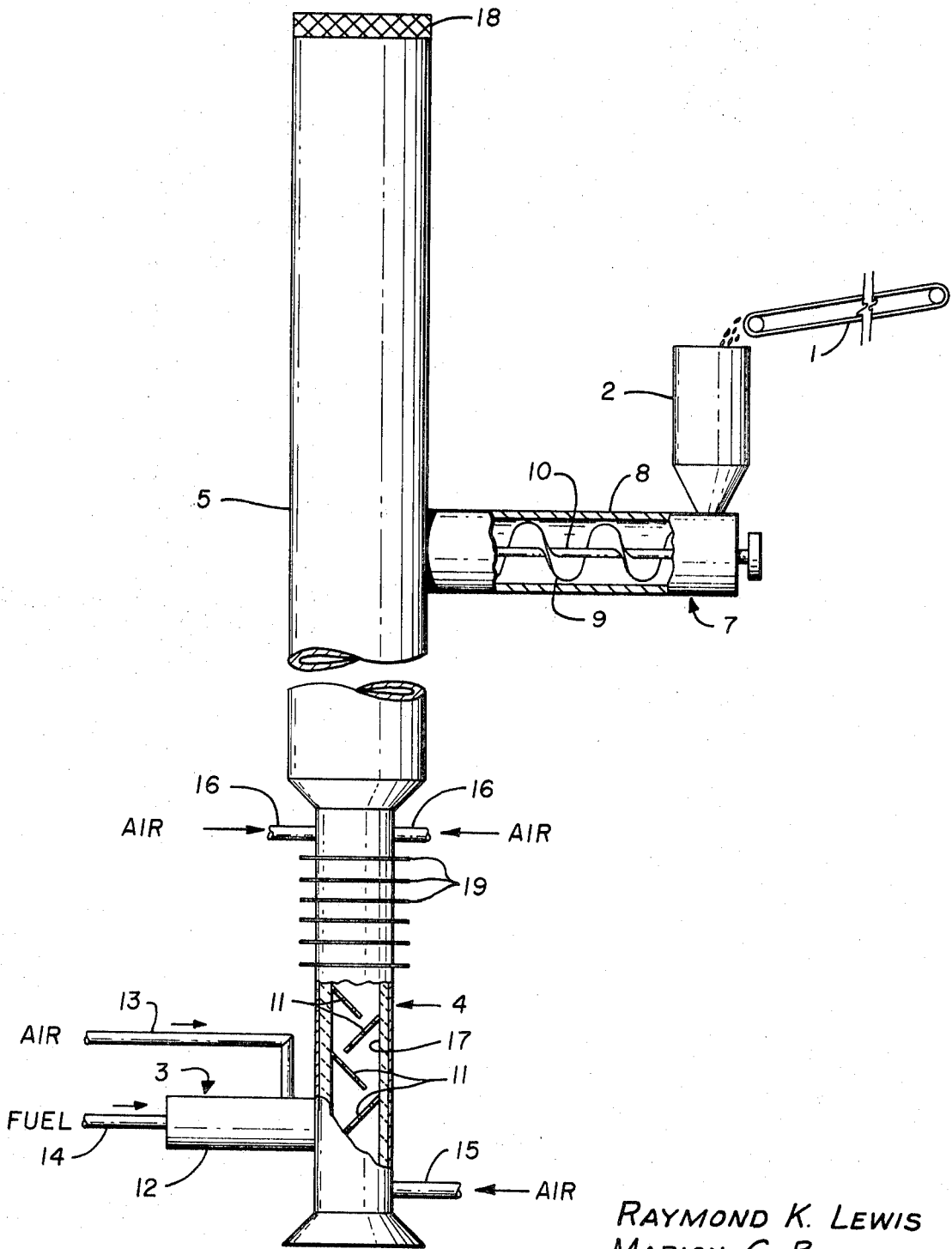
RAYMOND K. LEWIS
MARION G. BINGHAM
INVENTORS
BY
Delmar L. Graupe
ATTORNEY

PROCESS FOR THE REMOVAL OF HYDROCARBONS CONTAINED IN EARTH CUTTINGS FROM SUBTERRANEAN WELLS

BACKGROUND OF THE INVENTION

1. Field of the Invention

This invention relates to the removal of the hydrocarbon content of cuttings from subterranean wells by utilizing a nonair-fouling combustion process in an elongated combustion apparatus.

2. Description of the Prior Art

In the drilling of oil, gas and other subterranean wells it becomes necessary to remove earth cuttings from the bit area. This can be effectively done through utilization of a drilling fluid which is pumped down through the drill system to the bit and then returned to the surface through the annular space between the drill stem and the walls of the borehole. The circulated drilling fluid carries cuttings and sand from the base of the borehole to settling areas where these cuttings and rock particles settle out. Gas coming from the borehole and entrained in the fluid bubble out in the settling area. The drilling fluid is then pumped back to the drill stem and the cycle is repeated.

Although cleaning of the borehole is a primary function of a drilling fluid, other functions are equally important. Another function of the drilling fluid is to cool and lubricate the bit. The fluid also seals the walls of the well, thereby preventing undesirable seepage of gases and liquids into the borehole, loss of drilling fluid into the formation being drilled, and caving-in of the formation.

The drilling fluid systems normally utilized in drilling subterranean wells are complex in composition due to the requirements of weighting material which consists of inert solids which are added to increase the density of the fluid phase in order to control formation pressures. Other additives which may be colloidal in nature are added to provide structure capable of suspending drilling cuttings and material which has been sloughed from the side of the borehole.

While in the earlier days of rotary drilling the circulating fluid was nearly always in the nature of clay and water, sometimes with weighting agents added, in recent years the use of a fluid made up with a base liquid of oil instead of water has become commonplace. Such fluids are known as oil base systems, oil-in-water emulsion systems, and water-in-oil emulsion systems. In addition to their utility as drilling fluids, these systems are utilized in producing techniques as packer fluids between the casing and the production string or strings.

Generally speaking, cuttings from the borehole are removed from the drilling fluid system through the use of mechanical means such as shaker screens, desiltors, centrifuges, and the like. However, hydrocarbon additions to the drilling system cause the cuttings to become coated and saturated with oil which cannot be completely separated from the cuttings through the use of these mechanical means.

The disposal of these oil-contaminated cuttings poses a problem especially on offshore drilling rigs. Current pollution laws prohibit their disposal into water reservoirs. Transportation of the cuttings for disposal elsewhere is often not economically feasible. The economics of this approach depends largely upon the volume of cuttings produced, which is in itself dependent upon the size of the hole being drilled. Bit penetration rates must be considered another important factor. Under some circumstances it is necessary to provide a minimum of three to four days storage capacity at the rig or platform since inclement weather conditions may preclude continuous removal by boat.

Considerable disposal problems remain assuming the cuttings are transported to a treatment location. The use of oil-contaminated cuttings as fill material is somewhat limited because of possible land pollution. Open burning of the cuttings is not desirable because it does not remove all of the oil content of the cuttings. In addition, open burning would become a source of air pollution.

Another method of disposing of the oil-contaminated cuttings is to prepare a pumpable slurry by mixing the cuttings with sea water or brine. This slurry can then be pumped into an abandoned well. However, this method of disposal has several disadvantages. When utilizing this method, it is necessary to provide high pressure pumps to fracture a formation in order to dispose of large volumes of the cuttings. Satisfactory disposal rates would be difficult to maintain even when high pressure pumps are utilized. In addition, a stipulation in an oil and gas lease prohibiting the introduction of damaging extraneous material into mineral and water-bearing formations could prohibit subterranean injection of the slurry. It has also been suggested that underground waste disposal disturbs the stress balance of the earth's strata; which increases the likelihood of earthquakes and related disturbances. Not to be overlooked is the fact that equipment needed to prepare and pump the slurry is not only costly but is also space consuming, a fact which becomes particularly important on offshore oil and gas rigs.

Methods such as washing and separating cuttings effluent have proven equally unsatisfactory. Contaminated cuttings effluent consists primarily of a water phase containing diesel oil and clayey material. Theoretically, a three-phase separation would permit dumping the water phase into the sea, returning the diesel oil to the mud and leaving only a greatly reduced volume of clay to be disposed. Effluent separation processes obtaining these results include settling, filtration, electrophoresis, centrifuge, and flotation. One primary disadvantage common to all of these processes is the fact that where clay-water-oil slurries are involved it is necessary to remove almost all of the colloidal size clay particles before oil and water separation can be accomplished. This additional processing step is costly and time consuming, and requires additional equipment which utilizes valuable space on an offshore drilling rig.

Methods utilized in the prior art have generally been somewhat limited in their actual ability to effectively remove the hydrocarbon content in the cuttings. These processes have been effective only in reducing the hydrocarbon content to no less than about 3 percent by weight. We have discovered a process for combustion of oil-contaminated drill cuttings which has the advantage of reducing the hydrocarbon content of the material to less than about 0.03 percent by weight. In addition, our process can be readily and easily utilized on offshore drilling rigs requiring no pretreatment processes or the addition of extra storage tanks and other costly and space-consuming equipment. Our process produces complete combustion of hydrocarbons utilizing a combustion apparatus requiring minimum operating space, personnel, and maintenance. A further advantage in the utilization of our process is the prevention of harmful emissions of carbon monoxide, sulfur dioxide, and other air-fouling contaminants which are present in uncontrolled combustion processes. In addition, our process utilizes a combustion apparatus which has the distinct advantage of not requiring the addition of high rates of secondary fuels, such as diesel oil and the like. We have found under normal circumstances that controlled combustion of the oil-contaminated cuttings may be achieved through utilization of heat resulting from the combustion of the hydrocarbon content of the cuttings in conjunction with relatively small amounts of secondary fuels. The required combustion apparatus is extremely simple, of low initial cost and virtually maintenance free in operation. By contrast mechanical separation of the hydrocarbons from the cuttings is notoriously complex, relatively high in initial cost, and high in maintenance requirements.

It is an object of the present invention to provide a process for disposing of drilled cuttings from subterranean wells containing oil, solids, and water.

It is a further object of the present invention to provide a process for combustion of oil-contaminated cuttings from subterranean wells which will not emit carbon monoxide, sulfur dioxide and other gaseous pollutants into the atmosphere.

SUMMARY OF THE INVENTION

The process for disposing of oil-contaminated earth cuttings from subterranean wells utilizes a combustion mechanism which consists essentially of a cuttings conveyor assembly, a cuttings feed assembly, a fire section, a combustion section, and a stack or chimney section.

In treating the oil-contaminated earth cuttings, the material is transported from the mechanical separators adjacent to the drill sight to a feed assembly which is attached to the stack section by means of a screw conveyor or similar device. The material free falls through the stack and passes over one or more baffles or other retarding means in the combustion section which are necessary to reduce the rate of fall to assure proper and complete combustion of the cuttings. It is essential that the baffles be perforated, slotted or otherwise designed to retard the fall of cuttings without restricting the upward flow of the high volume of air required for complete combustion. As the cuttings fall through the baffle area within the combustion section, they are ignited by a combustion temperature exceeding 2,500° F. The material free falls through the stack and passes over one or more baffles or other retarding means in the combustion section which are necessary to reduce the rate of fall to assure proper and complete combustion of the cuttings. It is essential that the baffles be perforated, slotted or otherwise designed to retard the fall of cuttings without restricting the upward flow of the high volume of air required for complete combustion. As the cuttings fall through the baffle area within the combustion section, they are ignited by a combustion temperature exceeding 2,500° F. The ignition temperature is maintained at this level by (1) burning diesel or similar fuel in a burner adjacent to the combustion section and (2) controlling the combustion of cuttings passing through the system. After combustion, the oil-free cuttings are removed from the lower portion of the combustion section either by a conveyor belt, by use of some appropriate type of removal container or by simply allowing the cuttings to drop into the sea.

The oil-contaminated drill cuttings contain both solids and free liquids. Thus, a conveyor system should be utilized to transport the cuttings from the mechanical equipment utilized to separate the cuttings from the recirculating drilling fluid. The conveyor system must be capable of transporting solids as well as free liquid. Satisfactory conveyor systems include gravity conveyors, screw and spiral conveyors, Redler conveyors, bucket conveyors, belt conveyors and the like. Once the cuttings which are to be processed are conveyed to the decontamination process unit, a cuttings feed mechanism is required which will effectively control the rate of cuttings introduced into the combustion section for decontamination treatment. The feed rate may be accomplished by gravity or mechanical means through the use of screw spiral conveyors, dual batch cylinders or other similar mechanisms.

The fire section consists of a fuel supply source, an air source, and a burning head. The fire section is designed to achieve combustion of the oil-contaminated drill cuttings at temperatures in excess of 2,500° F.

The gas flow rate through the combustion section must be high enough to provide sufficient oxygen for complete combustion of the hydrocarbon content of all cuttings. However, it must be low enough to permit the fines to fall. It is crucial that the design and operation of this apparatus provide adequate oxygen flow for complete combustion without increasing the draft of gas or air flow to the point that the fines in the cuttings cannot fall through the combustion section. The delicate balance between the upward draft of air and the necessity that the fines be permitted to fall are further complicated by the fact that the larger cuttings fall faster than the fines, and the amount of oil retained is proportional to the cutting size, i.e., the larger the cuttings the more oil they retain. The rate of passage of such large cuttings through the combustion section must be controlled to insure that they will be heated to combustion temperature and that the combustion of the hydrocarbon content will be complete. Providing such control means for the passage of the larger cuttings through the combustion section seriously complicates the maintenance of the aforementioned delicate balance between the updraft of the large quantity of air required and the necessity that the fines be permitted to fall through the combustion section. It is essential that the means provided to retard the passage of the large cutting particles provide a minimum restriction upon the air passageway to avoid interferences with the fall of the fines. It has been found that baffle means may be used; however, it is necessary that such baffle means be so designed as to provide a minimum of restriction upon the passage of the air or gas through the combustion section. Perforated baffles or metallic or ceramic sheds are preferably utilized; however, slotted baffles, fins, rods or screens with adequate openings through or around such means for relatively free upward passage of gases may be used.

The stack section must be of sufficient diameter to prevent emission of fines. The section may be equipped with spray rings or similar devices to prevent such emission.

BRIEF DESCRIPTION OF THE ATTACHED DRAWING

The single drawing is an illustration of a combustion apparatus which can be utilized with the combustion process of the present invention.

DESCRIPTION OF THE PREFERRED EMBODIMENTS

Our process requires the use of a combustion apparatus, as shown in the attached drawing consisting essentially of a cuttings conveyor assembly 1, a hopper 2, a fire section 3, a combustion section 4, and a stack section 5. Other features such as flame arrestors and the like which do not interfere with the combustion process may also be added. Any suitable conveyor apparatus 1 capable of transporting the cuttings may be utilized. For example, belt conveyors, gravity conveyors, screw or spiral conveyors, Redler conveyors, and bucket conveyors may be utilized. Because of simplicity a belt-type conveyor passing over pulleys and operated by an electric or mechanical motor system is preferable. Because of high volume treatment requirements of present drilling practices, the conveyor system should be capable of transporting up to about 35,000 pounds of oil-contaminated cuttings per hour.

An integral part of the cuttings feed assembly is a storage hopper 2 which must be capable of holding sufficient quantities of cuttings to permit either batch processing or continuous processing. The size of the storage hopper 2 may vary considerably and will depend upon quantitative prerequisites at the selected treatment location. The material too be treated is delivered to the stack section 5 by gravitational or mechanical means. When mechanical means are utilized, a screw-spiral conveyor 7 has been found to be desirable. The material passes through the screw-spiral conveyor casing 8 by means of a helical fin 9 attached to an appropriate shaft 10 rotating in the casing in such a manner that the fin 9 transports the material from one end, to which is attached the lower end of the hopper 2, to the other, to which is attached the stack section 5. The screw-spiral conveyor 7 is rotated by appropriate mechanical means which allow proper control of feed rate. Other conveyor systems such as batch cylinder may also be used. This system operates on a cylindrical concept with a piston pushing the material from one end of the casing to the other.

The combustion section 4 is a metallic casing, the internal surface thereof extending from the stack section to the cuttings discharge opening, the internal surface thereof may be lined with a lining 17 such as ceramic fire brick or other insulating material to prevent heat decomposition of the metallic casing. The internal diameter of the combustion section 4 is not critical and may vary according to the quantity of cuttings to be treated. We have found under average conditions that an 8-inch diameter metallic casing will suffice. The length of the combustion section 4 may vary and will largely depend on the location and number of baffles 11 which are utilized in the process. Generally speaking, a combustion section 4 of about 10 feet in length should provide sufficient combustion area for normal treatment of cuttings. The cuttings fall by gravity through the vacant space in the combustion section 4 being dispersed in the downwardly drop more or less uniformly over the cross section of the combustion section 4. As the oil-contaminated cuttings continue a free fall through the combustion section 4 they enter the area adjacent to fire section 3 wherein the cuttings come in contact with sufficient heat from the burner 12 to complete combustion. This condition is obtained by the introduction of air entering conduit 13 and fuel such as diesel fuel or a hydrocarbon gas entering through line 14 and the mixture burned in burner 12 with the hot combustion gases resulting from burning the fuel with air passing upwardly through the combustion section 4 in direct contact with the oil-contaminated cuttings dropping down therethrough in order to impart sufficient heat to raise the particles to their flash point. Additional air required for combustion of the oil-contaminated cuttings may be introduced through one or more air intake lines 15 and 16. Such auxiliary air may be introduced as illustrated or at any desired points below, above or with the burner 12. The combustion gases resulting from the combustion of the hydrocarbon content of the cuttings are discharged through the top of the stack section 5. For more efficient combustion air and fuel may be preheated by passing them in indirect heat exchange with the hot products of combustion released through the stack section 5. Since considerable heat is generated by the combustion of the oil-contaminated cuttings, the fuel requirements are modest and the operation is highly efficient. The oil-contaminated cuttings which now will have a negligible hydrocarbon content will collect at the bottom of the combustion section 4 and may be discharged directly into the sea or other surface area or a suitable tray or other appropriate collecting device may be utilized.

The combustion temperature required for the oil-contaminated particles will vary considerably depending on the quantity and quality of the hydrocarbon content of the treated cuttings. The lower the volatility of the cuttings, the higher the combustion temperature, and, conversely, the higher the volatility of the cuttings, the lower the combustion point. Generally speaking, the oil-contaminated cuttings will require a combustion temperature of at least about 2,500° F. Under some circumstances, temperatures as high as 4,000° F. may be required to effectively destroy the hydrocarbon content of the cuttings. Factors other than quality and quantity of the hydrocarbon content influencing the temperature required for effective combustion include the average particle size of the cuttings, the velocity of free fall within the combustion section, the number, size, and arrangement of baffles located within the combustion section, the length and diameter of the combustion section, insulation of the combustion section, the quantity and quality of secondary fuel utilized in the burner and other like variations.

Thus, from a knowledge of the quality and quantity of hydrocarbons in the cuttings and other physical properties, the length of the combustion zone and the falling velocity of the cuttings, it is possible to calculate a temperature for the combustion zone which will result in essentially complete destruction of the hydrocarbon content of the cuttings thus preventing pollution of the atmosphere by emission of CO, $SO_2$ and other contaminants. This temperature may then be obtained by proper adjustment of the air and fuel ratios.

The required temperature in the combustion zone may also be obtained by initiating the operation and analyzing samples of the processed cuttings to determine whether effective removal of hydrocarbons has been accomplished and then by varying the amount of secondary fuel for combustion, increasing or lowering the temperature in the combustion section until the proper temperature is arrived therein to produce an essentially hydrocarbon free material. The amount of air introduced into the combustion apparatus will vary dependent on the amount of oil-contaminated cuttings present and can be determined by calculation or by simply maintaining an excess quantity of air during combustion to insure effective combustion of the oil-contaminated cuttings. Excess air may be employed through utilization of mechanical fans and/or additional air intake valves.

In order to reduce the velocity of free falling oil-contaminated cuttings, it is necessary to utilize devices such as one or more metallic or ceramic sheds, plates, or baffles. These are attached to the surface of the inner wall of the combustion section at any desirable angle which will effect a satisfactory reduction in free fall velocity resulting in good combustion rates for the cuttings. We presently prefer three or more perforated baffles 11 utilized at a 45° angle to the surface of the combustion section which will result in good reduction in cuttings free fall.

The stack section 5 is attached by appropriate means, such as arc welding, directly to the top of the combustion section 4 and may be made of metallic, ceramic or other appropriate material. The function of the stack section is to prevent the emission of fine particles resulting from minute cuttings being forced upward by the hot gases resulting from the combustion process. The stack should have a larger diameter than the combustion section in order to assure effective entrapment of the fines. The stack section preferably should be at least twice as high as the combustion section. We have found under most combustion operations that a stack at least about 28 feet long having a 13⅜-inch diameter will adequately control the fines. The stack is equipped with a flame arrestor 18 at the top. Other safety devices such as heat exchange fins 19, at the upper portion of the combustion section, water spray devices, dust eliminators and the like may also be utilized.

In order to obtain fast combustion of the oil-contaminated cuttings, it is necessary that sufficient air be injected into the fire and combustion sections by means of adequate air intake lines 15 and 16 which may be located at convenient places above, below, and adjacent to the burner assembly. For example, oxygen required for combustion of the oil-contaminated cuttings may be introduced through air intake line 15 at a point below the burner 12. It is advantageous to introduce the air for combustion at a point below the burner to provide an arresting zone to terminate continuation of the combustion reaction. The introduction of cooler air at a point well below the burner provides an arresting zone in the combustion section wherein the cuttings leaving the combustion zone are dropped materially in temperature by direct contact with the cooler air thereby assuring termination of the combustion process. Other air intake valves may be located somewhat above the burner unit and above the baffles. The location and number of air intake valves is not critical and will vary upon the specific size and construction of the combustion apparatus.

The following examples further illustrate the process of the present invention.

EXAMPLE I

The apparatus employed was as illustrated in the attached drawing and consisted of a cylindrical combustion apparatus 38 feet 1 inch in height. The apparatus contained a combustion section below an attached stack section. The combustion section consisted of a metallic tube approximately 10 feet in height with an 8-inch diameter. The stack section was a metallic tube approximately 28 feet high with a 13⅜-inch diameter. A burner was attached to the combustion section approximately 2 feet from the bottom of the unit. Three perforated metal baffle plates were each installed at a 45° angle above the burner inlet. Air inlets were located above and below the burner apparatus with additional air supplied by a blower passing air concentrically around the combustion zone. The combustion section tube had an open bottom for collection of the treated cuttings. Three runs were made utilizing supplemental fuel rates of 51.40 gal/hr, 34.25 gal/hr, and 24.40 gal/hr, respectively. Into the top of the apparatus was fed at a rate in excess of 2,000 pounds per hour oil-contaminated cuttings containing approximately 10 percent hydrocarbons by weight. The oil-contaminated cuttings dropped down in dispersed condition into the combustion section wherein the cuttings came into contact with hot combustion gases at a temperature in excess of 2,500° F. generated by burning diesel fuel with air in the burner apparatus. Air for combustion was also introduced into the bottom of the combustion zone (line 15) and passed upwardly throughout the combustion zone. The respective amounts of diesel oil were burned with the supplemental air rate properly established. After passing through the combustion zone the treated cuttings were collected at the bottom of the apparatus and analyzed for hydrocarbon content. Adjustments were made at the initiation of the operation with the burner and air supply until the product discharged from the bottom of the apparatus showed a substantial reduction in hydrocarbon content and gases emitted from the top of the stack were essentially free of air contaminants as shown in example II. The operation was continued under these conditions. The fines and heavys of the treated cuttings were analyzed for oil content by extracting a weighed amount with carbon tetrachloride and diluting the extract to a known volume. The infrared absorption at a frequency of 2,930 cm.[11] was measured in a sealed 1.0 mm. KBr cell. This is the carbon-hydrogen streach absorption. Comparison was made to a calibration curve prepared with diesel oil in carbon tetrachloride solution. Measurements where made on a Perkin-Elmer Model 337 Spectrophotometer. The results were as follows:

|  | Oil weight percent, fines | Oil weight percent, heavys |
|---|---|---|
| Run number: | | |
| 1 | 0.02 | 0.16 |
| 2 | 0.006 | 0.03 |
| 3 | 0.03 | 0.08 |

EXAMPLE II

Gas samples were taken from the top of the combustion apparatus during the runs and analyzed for carbon monoxide and sulfur dioxide content by gas chromatography. A 5A molecular sieve column was used for the CO analysis and a Firebrick SE30 column for $SO_2$. The columns were of glass construction to minimize gas absorption. The instrumentation used was a Model 200 Varian Aerograph. The results of these analyses showed a minimal quantity of these contaminants. The results of these analyses are as follows:

|  | Percent CO, by volume | Percent $SO_2$, by volume |
|---|---|---|
| Run number: | | |
| 1 | 0.003 | Less than 0.0001. |
| 2 | 0.003 | Do. |
| 3 | 0.01 | Do. |

Although certain preferred embodiments of the invention have been disclosed for purpose of illustration, it will be evident that various changes and modifications may be made therein without departing from the scope and spirit of the invention.

We claim:

1. An incinerator apparatus for the removal of the hydrocarbon content of hydrocarbon-containing cuttings comprising an elongated combustion apparatus, having a combustion section, a fire section connected to the lower portion of the combustion section, and a stack section having greater cross-sectional area than said combustion section connected to the upper end of said combustion section, said fire section comprising a burner, fuel inlet and an air inlet, auxiliary air inlet means for introducing excess oxygen into said combustion section, and means for retarding the passage of hydrocarbon-containing cuttings through the combustion section, said means for retarding the passage of said cuttings being further adapted and arranged to permit substantially unrestricted flow of gases through said combustion section.

2. The apparatus of claim 1 in which said means for retarding passage of cuttings through the combustion section comprises at least one perforated baffle.

3. A process for the removal of the hydrocarbon content of hydrocarbon-containing cuttings from the drilling of subterranean wells which comprises introducing the hydrocarbon-containing cuttings into the top of an elongated combustion apparatus, passing said cuttings downwardly by force of gravity through the elongated combustion apparatus, introducing hot combustion gases into said elongated combustion apparatus, introducing hot combustion gases into said elongated combustion apparatus in direct contact with a countercurrent to the hydrocarbon-containing cuttings dropping down through the elongated combustion apparatus to raise the temperatures of the hydrocarbon-containing cuttings to cause combustion of the hydrocarbons and removing same, introducing oxygen into said elongated combustion apparatus countercurrent to and in direct contact with the hydrocarbon-containing cuttings to effect combustion of the hydrocarbon-containing cuttings at their flash point to convert said hydrocarbons into gaseous products, introducing oxygen into said elongated combustion apparatus at a point below the introduction of said hot combustion gases to cool the treated cuttings and to preheat said oxygen, and discharging the cooled cuttings from the elongated combustion apparatus.

4. The process as in claim 1 wherein the combustion gases are generated by burning a fluid hydrocarbon with air.

5. The process as in claim 1 wherein air is employed as the source of oxygen for combustion of the hydrocarbon-containing cuttings and for cooling the cuttings after processing.

UNITED STATES PATENT OFFICE
CERTIFICATE OF CORRECTION

Patent No. 3,570,420      Dated March 16, 1971

Inventor(s) Raymond K. Lewis; Marion G. Bingham

It is certified that error appears in the above-identified patent and that said Letters Patent are hereby corrected as shown below:

Col. 7, line 29, "$cm^{11}$" should read -- $cm-1$ --

Col. 8, lines 39-40, delete "introducing hot combustion gas into said elongated combustion apparatus"

Col. 8, line 33, "a" should read -- and --

Signed and sealed this 14th day of September 1971.

(SEAL)
Attest:

EDWARD M. FLETCHER, JR.          ROBERT GOTTSCHALK
Attesting Officer                Acting Commissioner of Patents